(12) United States Patent
Neil

(10) Patent No.: US 7,920,783 B2
(45) Date of Patent: Apr. 5, 2011

(54) CAMERA AND LENS SYSTEM

(75) Inventor: Iain A. Neil, Massagno (CH)

(73) Assignee: ACM Projektentwicklung GmbH, Salzburg (AT)

(*) Notice: Subject to any disclaimer, the term of this patent is extended or adjusted under 35 U.S.C. 154(b) by 123 days.

(21) Appl. No.: 12/345,052

(22) Filed: Dec. 29, 2008

(65) Prior Publication Data
US 2010/0166403 A1  Jul. 1, 2010

(51) Int. Cl.
G03B 13/18 (2006.01)
(52) U.S. Cl. .......................................... 396/147
(58) Field of Classification Search .................. 396/147, 396/88
See application file for complete search history.

(56) References Cited

U.S. PATENT DOCUMENTS

| | | | |
|---|---|---|---|
| 1,176,399 A | 3/1916 | Needham | |
| 2,878,734 A * | 3/1959 | Colaiace | 396/147 |
| 2,926,576 A | 3/1960 | Gunther | |
| 3,080,806 A * | 3/1963 | Von Stwolinski | 396/155 |
| 3,092,001 A * | 6/1963 | Schlapp | 396/147 |
| 3,101,658 A * | 8/1963 | Hayes | 396/147 |
| 4,053,211 A * | 10/1977 | Momiyama | 359/823 |
| 5,706,143 A | 1/1998 | Hipp | |
| 2007/0183059 A1 | 8/2007 | Miyaji | |

FOREIGN PATENT DOCUMENTS

| GB | 546881 | 8/1942 |
|---|---|---|
| GB | 793179 | 4/1958 |

OTHER PUBLICATIONS

International Search Report, Jun. 1, 2010.

* cited by examiner

Primary Examiner — Clayton E Laballe
Assistant Examiner — Leon W Rhodes
(74) Attorney, Agent, or Firm — Lowenstein Sandler PC

(57) ABSTRACT

A camera assembly, preferably a cinematographic camera assembly, comprises a camera housing and a plurality of interchangeable lenses which can be attached to the camera housing for capturing an image. Each lens has a body and a lens system comprising at least one lens element that is movable relative to the lens body to alter the focus distance of the lens, the lens having a focal length that differs from the focal length of the each other lenses. Each lens has a focus scale on one of the lens system and the lens body that comprises a plurality of focus distance marks, and a focus index mark on the other of the lens system and the lens body.

35 Claims, 6 Drawing Sheets

CAMERA AND LENS SYSTEM

FIELD OF INVENTION

This invention relates to cameras and to lenses for use in such cameras. In particular, although not exclusively, the invention relates to high performance cameras and lenses, that are used for professional purposes. Of particular interest are cinematographic cameras either employing silver halide emulsions or digital electronic imaging systems, high definition television systems ("HDTV") and advanced television ("ATV").

BACKGROUND OF THE INVENTION

For many years, portable film and video cameras have been available for private or "home movie" use. Focusing may be achieved by auto focusing through the lens, or by aligning a focus distance number for example located on a focus ring on the lens with a focus index mark. While such arrangements are light and highly portable, they are satisfactory only for low end applications. At the other extreme, the highest performance camera equipment has been employed in professional cinematography for taking professional motion pictures. In this application, a camera operator will typically control the composition of the shot by panning and tilting the camera, and optionally zooming, while a camera assistant, called a "focus puller" will attend to ensuring that the camera is in focus during the shot. This may be achieved by rotating a focus ring on the lens in order to align a focus distance mark on a focus scale located on the lens with a focus index mark normally fixedly located on the lens. Alternatively, a "follow focus" motor drive may be employed for altering the focusing of the lens. In such lenses, the focus scale will typically not be simply an array of focus distance numbers as in the cases of amateur equipment with the consequential error in setting the focus distance caused by the finite dimensions of the numbers, but will instead be an array of focus distance marks of small lateral dimensions, each mark being associated with a number giving the focus distance in feet or meters. These focus distance marks may be represented by lines nearby the focus distance numbers. Alignment of focus distance marks with a focus index mark will lead to a significantly more accurate setting of the focus distance. The scales will normally be calibrated before shipping, but even so, in some cases it may be desired to place blank focus distance rings on the lens after manufacture or after renting the lens and to calibrate the lens by focusing on objects at different distances and drawing marks on the ring corresponding to the distance of the object.

More recently, compact film and video camera systems which may be used in high performance imaging applications have become available. Although usually not as small as home movie cameras, such equipment may for example be employed in film making and also in "electronic news gathering" (ENG) applications in which perhaps only one operator is employed both to take the pictures and to focus the camera, and the equipment is carried on the shoulder of the operator. This has led to a demand for compact and lightweight objective lenses of the same general performance as has been customary for professional movies.

In the case of systems employing interchangeable lenses, it is desirable to improve the ease with which the lenses may be changed and focused when focusing is performed manually or by means of motors. However this may be difficult due to a number of reasons, for example with compact lens systems the circumference of the lens may be relatively small with the result that for certain focus distances the focus distance marks may become compressed.

SUMMARY OF THE INVENTION

The invention aims to provide an improved camera and lens arrangement.

According to one aspect, the present invention provides a camera assembly which comprises a camera housing and a plurality of interchangeable lenses, any one of which can be attached to the camera housing for capturing an image;

each lens having a body and a lens system comprising at least one lens element that is movable relative to the lens body to alter the focus distance of the lens, the lens having a focal length that differs from the focal length of the or each other lens;

wherein each lens has a focus scale on one of the lens system or movable lens element and the lens body that comprises a plurality of focus distance marks, and a focus index mark on the other of the lens system or movable lens element and the lens body, so that the lens can be focused at a desired focus distance by relative movement of the focus scale and the focus index mark to align the focus index mark with the focus distance mark on the focus scale corresponding to the desired focus distance;

the focus scale extending between a position corresponding to a far focus distance and a position corresponding to a close focus distance, and being divided into at least two sub-ranges that adjoin at a position corresponding to an intermediate focus distance, one of the sub-ranges being a principal sub-range wherein the relative position of the focus scale and the focus index mark that is required to focus the lens at any focus distance within the principal sub-range is substantially the same for at least two lenses and especially for all lenses in the assembly.

Such an assembly has the advantage that the lenses may all have similar ergonomics for focusing the lens at focus distances in the principal sub-range, for example if the lens is to be focused by hand, the degree by which the lens or the focus ring of the lens needs to be rotated, and hence the hand action of the operator, is the same for different lenses, or if the lens is focused by means of a mechanical device such as a follow focus gear the same gearing or algorithm may be employed for lenses of different focal lengths.

As stated above, the lens system comprises at least one lens element that is movable relative to the lens body in order to alter the focus distance of the lens. Thus, for example, the lens system may comprise a single lens element only, the lens element being movable in order to focus the lens, or it may comprise a number of lens elements, any one or more of which may be movable with respect to the lens housing and/or with respect to the other lens element or elements for focusing the lens. Typically, although not necessarily, the lens system will comprise a number of lens elements, one or more of which, whether internal or external, may move along the lens axis for focusing. Other lens elements, whether internal or external, may be static. It will be appreciated that the precise manner in which the lens focuses the image is not essential to the present invention, and references herein to the lens system or the lens group moving in order to focus the image should be understood as meaning that the lens system or the lens group, comprising a plurality of lens elements, may move either as a whole or in parts, and that parts thereof need not necessarily move during focusing.

As will be appreciated, it is generally not possible or desirable for the full range of focus distances to be accommodated by the same focus scale where the focal length of the different lenses may vary by a considerable degree, for example from, say, 16 mm, and normally from 20 mm for a wide angle lens to, say 100 mm usually up to 300 mm or more for a telephoto lens. According to the invention, the focusing operation of the lens is preferably the same for lenses of different focal length over a principal sub-range that covers the most commonly used focus distances, for example extending from a focus distance of 20 feet to a focus distance of six feet, although this may be increased to a sub-range corresponding to a focus distance of infinity to a focus distance of six feet. However, assemblies according to the invention may employ a principal sub-range spanning different focus distances since this is to some extent a question of artistic demand.

Also, normally the focus scale extends around part of the circumference of the lens, and the relative movement of the focus scale and the focus index mark is effected by rotation of one of the focus scale and the focus index mark about the lens body.

Thus, according to another aspect, the invention provides a lens which can be attached to a camera housing for capturing an image;

the lens having a body and a lens system that is movable as a whole or in parts (i.e. having at least one lens element that is movable) relative to the lens body to alter the focus distance of the lens;

wherein the lens has a focus scale comprising a plurality of focus distance marks extending around part of the circumference of one of the lens system and the lens body, and a focus index mark on the other of the lens system and the lens body, so that the lens system can be moved along the axis of the lens system to focus the lens at a desired focus distance by relative rotation of the focus scale and the focus index mark to align the focus index mark with the focus distance mark on the lens scale corresponding to the desired focus distance;

the focus scale extending between a position corresponding to a far focus distance and a position corresponding to a close focus distance, and being divided into at least two sub-ranges that adjoin at a position corresponding to an intermediate focus distance, one of the sub-ranges being a principal sub-range in which the position of the lens system varies in proportion to relative angular position of the focus scale and the focus index mark, and the other of the sub-ranges being an additional sub-range in which the position of the lens system is not necessarily proportional to the relative rotation of the focus scale and the focus index mark. It is possible for the position of the lens in the sub-range to be proportional to the relative rotation of the focus scale over part of its length, although it is preferable that there is a smooth transition between the principal and additional sub-ranges in the region of the focus scale corresponding to the intermediate focus distance.

According to yet another aspect of the invention, there is provided a method of forming a range of interchangeable camera lenses, which comprises forming a number of lenses, each lens having a body and a lens system that is movable relative to the lens body to alter the focus distance of the lens, and having a focal length that differs from the focal length of the or each other lens; and forming a focus scale on one of the lens system and the lens body that comprises a plurality of focus distance marks, and a focus index mark on the other of the lens system and the lens body, so that the lens can be focused at a desired focus distance by relative movement of the focus scale and the focus index mark to align the focus index mark with the focus distance mark on the lens scale corresponding to the desired focus distance;

the focus scale extending between a position corresponding to a far focus distance and a position corresponding to a close focus distance, and being divided into at least two sub-ranges that adjoin at a position corresponding to an intermediate focus distance, one of the sub-ranges being a principal sub-range wherein the relative movement of the focus scale and the focus index mark that is required to focus the lens at any focus distance within the principal sub-range is substantially the same for at least two lenses.

Although intended for professional use, the lenses and lens assembly according to the invention may also be employed for amateur use, for example in so-called camcorders, where interchangeable lenses are required.

The present invention will now be described by way of example in connection with embodiments thereof with reference to the accompanying drawings. However, it is to be noted that various changes and modifications will become apparent to those skilled in the art. Such changes and modifications are to be understood as being included within the scope of the present invention as defined by the appended claims.

DETAILED DESCRIPTION

Figure 1:
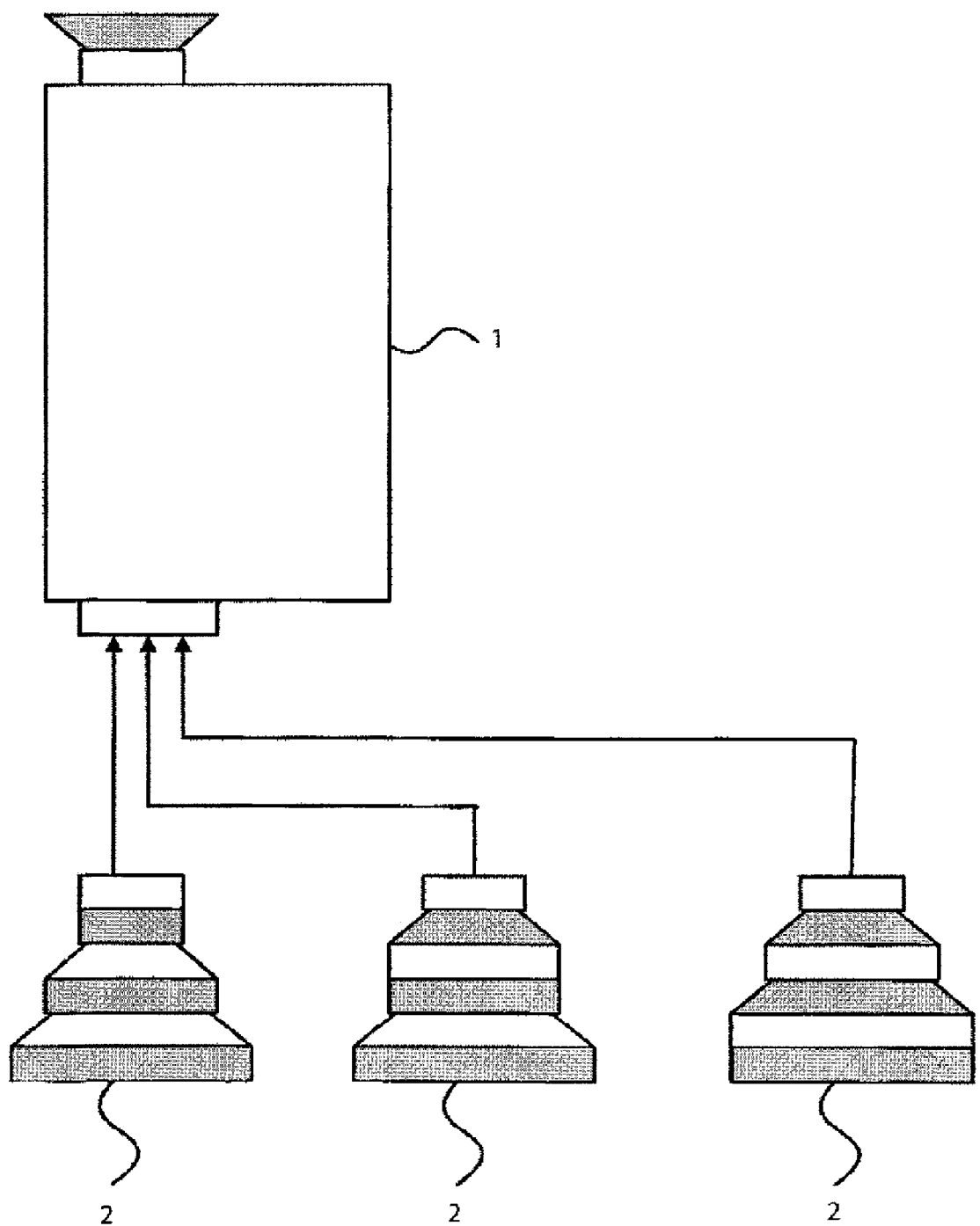
FIG. 1 is a schematic side elevation of an assembly according to the invention comprising a camera housing and a plurality of interchangeable lenses.

Referring to the accompanying drawings, an assembly according to the present invention is schematically shown in FIG. 1. The assembly comprises a camera body 1 for a high quality cinematographic or video camera that may be used for producing professional motion pictures or for high end electronic news gathering, together with an array of interchangeable lenses 2 that may be attached to the camera body. Each lens 2 has a focal length that differs from the focal length of the other lenses, and although only three lenses are shown, a larger number of lenses may be employed depending on the purpose. Typical focal lengths of the lenses may be 16 mm, 18 mm, 21 mm, 25 mm, 35 mm, 40 mm, 50 mm, 75 mm, 100 mm, 200 mm or other values.

Figure 2:
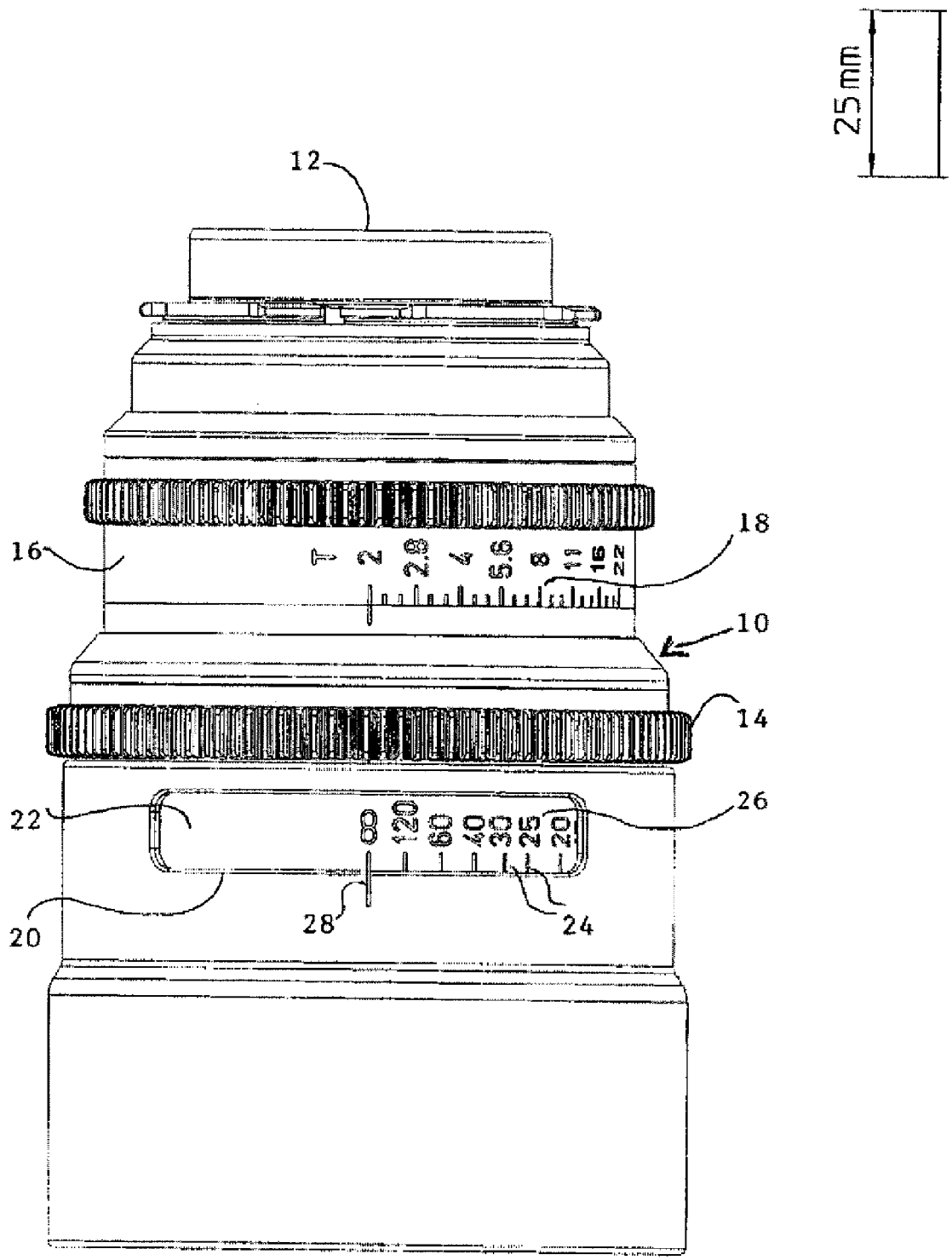
FIG. 2 is a side elevation of one lens that may be employed in the assembly shown in FIG. 1.

FIG. 2 shows one such lens in greater detail. The lens comprises a lens body 10 which houses a lens group (not shown) located within it, and a mounting arrangement 12 for attaching the lens to a corresponding mounting on the camera body. The lens has a focus ring 14 that can be manually rotated about the axis of the lens in order to move the lens group or any specific lens element(s) inside the lens body forwardly or rearwardly within the body along the optical axis of the lens group. The focus ring is cut to form gear teeth about the periphery of the ring that may provide a knurled surface for manual rotation of the ring about the lens body or for engagement with teeth of a gear of a mechanical focusing arrangement (not shown) such as a follow focus gear. An aperture ring 16 is also provided for varying the aperture of the lens. The aperture ring 16 may be formed as a gear in a similar manner as the focus ring 14, and an aperture scale 18 is provided adjacent to the aperture ring 16.

Adjacent to the focus ring 14 the lens body 10 has a generally rectangular aperture 20 that exposes a focus scale 22 to allow it to be viewed by a camera operative. The focus scale 22 is attached to the lens group of the lens and is fixed with respect thereto at least as far as circumferential movement is concerned (although the lens group or lens element(s) may move with respect to the focus scale along the optical axis of the lens). The focus scale has an array of focus distance marks 24 in the form of thin lines, which are associated with numerals 26 indicating the focus distance. In addition, a focus index mark 28 is provided on the lens body 10 of the same or similar width as that of the focus distance marks 24 so that, by rotating the focus ring 14, the focus index mark may be aligned with any one of the focus distance marks 24, the focus index mark 28 being aligned with the focus distance mark for infinity as shown in the drawing. By the use of focus distance marks that take up much less space in the circumferential direction than the focus distance numerals 26, positioning of the focus distance scale 22 to the desired focus distance may be performed much more accurately than if the focus scale consisted only of the focus distance numerals 26.

Of course, it is not essential to the invention for the focus scale to be fixed to the lens group and the focus index mark to be located on the lens body. It is quite possible for the focus scale to be fixed to the lens body and the focus index mark to be fixed to the lens group so that the lens index mark is rotated in order to focus the lens rather than the focus scale.

Figure 3:
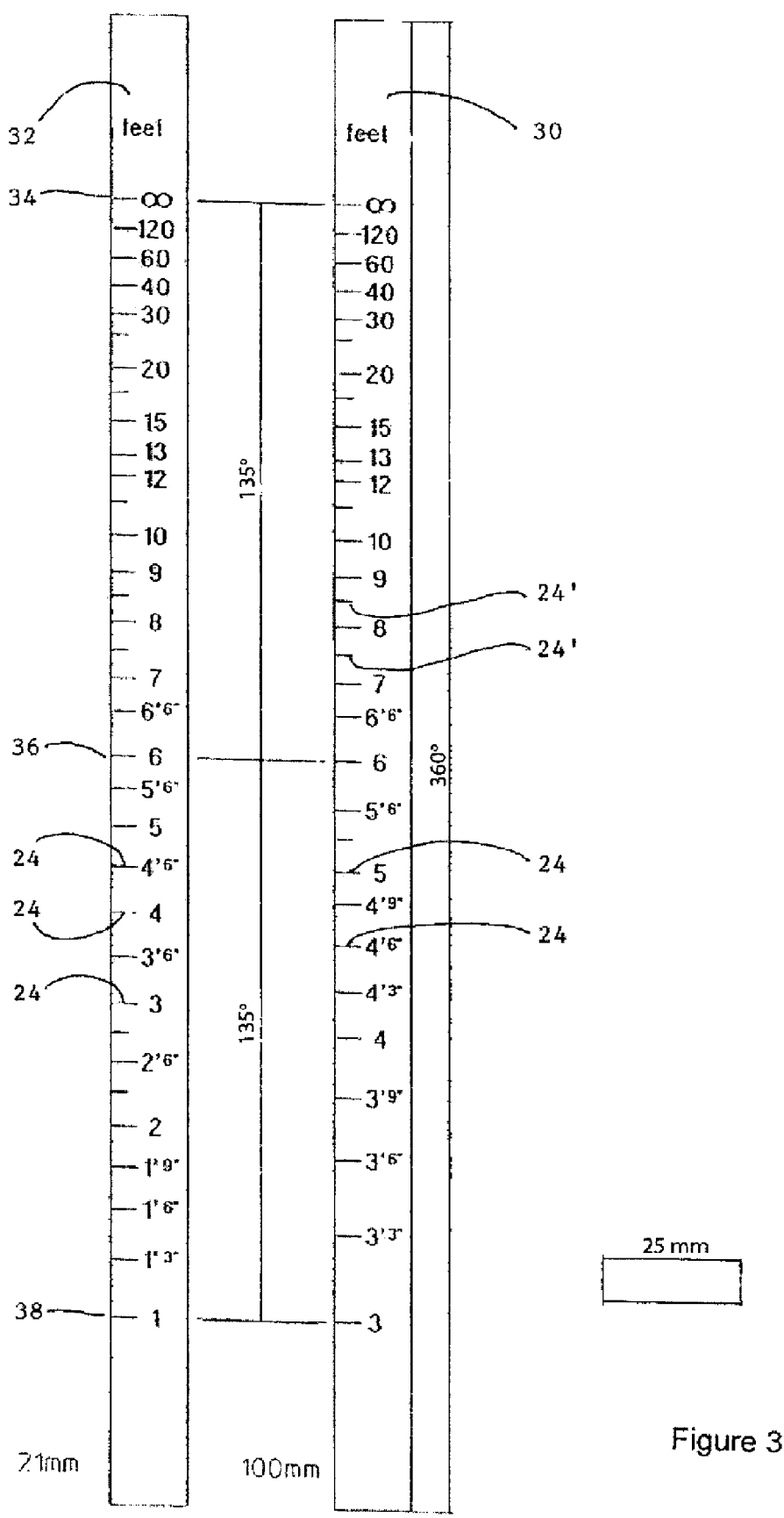
FIG. 3 is a plan view of a pair of focus scales that may be used with two different lenses in the assembly according to the invention.

FIG. 3 shows a pair of lens focus scales that may be employed for two different lenses in the assembly according to the invention. One focus scale 30 reproduced on the right as shown in the figure is intended for use on a 100 mm focal length lens, while the other focus scale 32 is intended for use on a shorter focal length lens, 21 mm in this case. Each focus scale has an array of focus distance marks 24 which may be aligned with the focus index mark 28 (shown in FIG. 2), and has an array of focus distance numerals 26 (FIG. 2) associated with the focus distance marks 24 in order to be able to read the focus distance setting when one of the focus distance marks is aligned with the focus index mark on the lens body. Most focus distance marks are associated with a figure showing the focus distance, although it is not necessary for each focus distance mark to be provided with its own focus distance number. In view of the significantly larger size of the focus distance numbers than the focus distance marks (in the circumferential dimension or vertically as shown in FIG. 3), some focus distance marks, for example those marks 24' corresponding to 7½ feet and 8½ feet, may not be associated with a focus distance number in order to prevent overcrowding of the focus scale.

The focus scale 30 is for use in a 100 mm focal length lens, and in this embodiment of the invention is linear over the entire scale, that is to say, the axial movement of the lens group from a reference position (for example the position corresponding to a focus position at infinity) is proportional to the degree by which the focus ring is rotated over the entire focus scale. The lens could therefore be made by supporting the lens group in the lens body by means of a screw thread or a cam follower that engages a cam in the lens body of helical shape. The focus distance of the lens thus varies substantially in accordance with the reciprocal of the position of the focus index mark along the focus scale as the focus ring is rotated from a position corresponding to infinity down to 3 feet.

FIG. 3 also shows a focus scale 32 for another lens used in the camera assembly according to the invention which has a shorter focal length, in this case 21 mm, and which extends over substantially the same length as the 100 mm focus scale 30 (i.e. the same degree of rotation as the 100 mm focal length lens). Of course, if any lens has a diameter that differs from that of the 100 mm focal length lens, the physical length of the focus scale will need to be changed in order to accommodate differences in the circumference of the lens. Whereas the range of focus of the 100 mm lens extends from infinity down to 3 feet, the range of focus of the 21 mm lens extends from infinity to 1 foot. The focus scale 32 for the 21 mm lens is not linear over the entire focus scale as is that of the 100 mm lens but instead is divided into two sub-ranges, one sub-range extending from a focus distance 34 of infinity down to an intermediate focus distance 36 of six feet, and a second sub-range extending from the intermediate focus distance of six feet to a close focus distance 38 of one foot. The sub-range extending from infinity to six feet is referred to as the principal sub-range and is linear and, in essence, the same as that part of the focus scale 30 of the 100 mm focal length lens that also extends from infinity to 6 feet so that, in order to focus a lens at a focus distance in the range of from six feet to infinity, exactly the same manipulation of the focus ring is required or mechanical drive of the focus is required if automatic focusing is used, irrespective of the focal length of the lens.

As the object moves closer to the lens beyond the intermediate focus distance 36 of the principal sub-range the focus ring of the lens is rotated to align the focus index mark 28 (shown in FIG. 2) with the relevant part of the focus scale between the intermediate focus distance 36 and the close focus distance 38, which forms an additional sub-range. The additional sub-range is not linear in this embodiment as is the principal sub-range (i.e. so that movement or travel of the lens group from a given point is proportional to the degree of rotation of the focus ring) but instead is compressed, so that rotation of the focus ring through a given angle will cause the lens group to move through a greater distance than it does in the principal sub-range, and thus cause the focus distance of the lens to reduce by more than that of the 100 mm lens. For example, the same degree of rotation that reduced the focus distance of the 100 mm lens from 6 feet to 4 feet will cause the focus distance of the 21 mm focal length lens to be reduced from 6 feet to about 2 ft 9 in, and rotation to a focus distance of 3 ft in the 100 mm focal length lens will cause focus distance of the 21 mm focal length lens to reduce to 1 foot.

The change in the degree by which the lens group is moved in the 21 mm focal length lens for a given rotation of the lens ring may be achieved by changing the pitch of cam surfaces in the lens body by which cam followers on the lens group and hence the lens group itself are caused to travel along the optical axis of the lens during rotation of the lens focus ring.

Conversely, for lenses having a focal length greater than, say, 100 mm, it may be desirable to extend the additional sub-range rather than to compress it, so that rotation of the focus ring through a given angle will cause the lens group to move through a smaller distance than it does in the principal sub-range, and thus cause the focus distance of the lens to reduce by less than that of the 100 mm lens. However, longer focal length lenses tend to have larger close focus distances and this may or may not be necessary.

Also, especially near the position corresponding to the close focus position, it is possible that the rate at which the lens element(s) move as the focus ring is rotated may change abruptly if additional elements are brought into or taken out of play, or in view of other physical changes in the lens.

Figure 4:
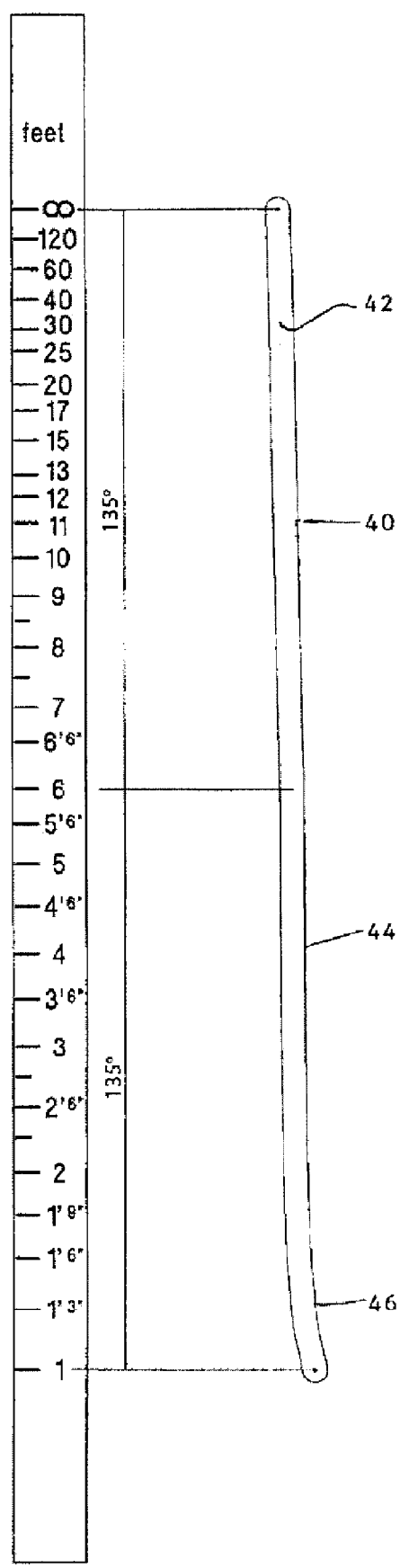
FIG. 4 is a view of one focus scale of a 21 mm lens that may be used in the assembly according to the invention shown beside a cam used in the lens.

FIG. 4 is a view of the focus scale for a 21 mm lens as shown in FIG. 3 shown beside, and to the same scale as, one cam 40 that is cut in the lens housing. The focus scale and the cam are typically connected so that rotation of the focus ring around the lens (corresponding to shifting of the focus ring vertically in the drawing) has the effect of moving a cam follower, and hence moving the lens group horizontally. Normally, more than one, and usually two, cams and cam followers will be present located at opposite sides of the lens, so that the second cam would be of the same form as the cam shown in the drawing but shifted vertically by 180° in the case of two cams, or some other angle. For example, for n cams and cam followers the cams may be shifted by (360/n)°.

As can be seen, the cam is divided into two parts. A first part 42 of the cam extending from the infinity focus distance to the six feet focus distance is generally straight as shown in the drawing and extends at an angle to the focus ring so that it will extend helically round the lens housing, and will therefore cause the lens group to travel axially for a distance proportional to the rotation of the focus ring. A second part 44 of the cam extending from the six feet focus distance to the one foot focus distance is generally straight (not exactly, it is only straight at a single point of interface with the other cam portion and immediately has a changing gradient thereafter) and at the same angle as the first part 42 of the cam in the region (not region, actually at a point) thereof at the middle of the focus ring corresponding to the intermediate focus distance (six feet), but at its end region 46 corresponding to the close focus distance the cam is curved so that the pitch of the helix described by the cam increases, and the travel of the lens group along the axis of the lens for any given rotation of the focus ring will increase.

Figure 5A:
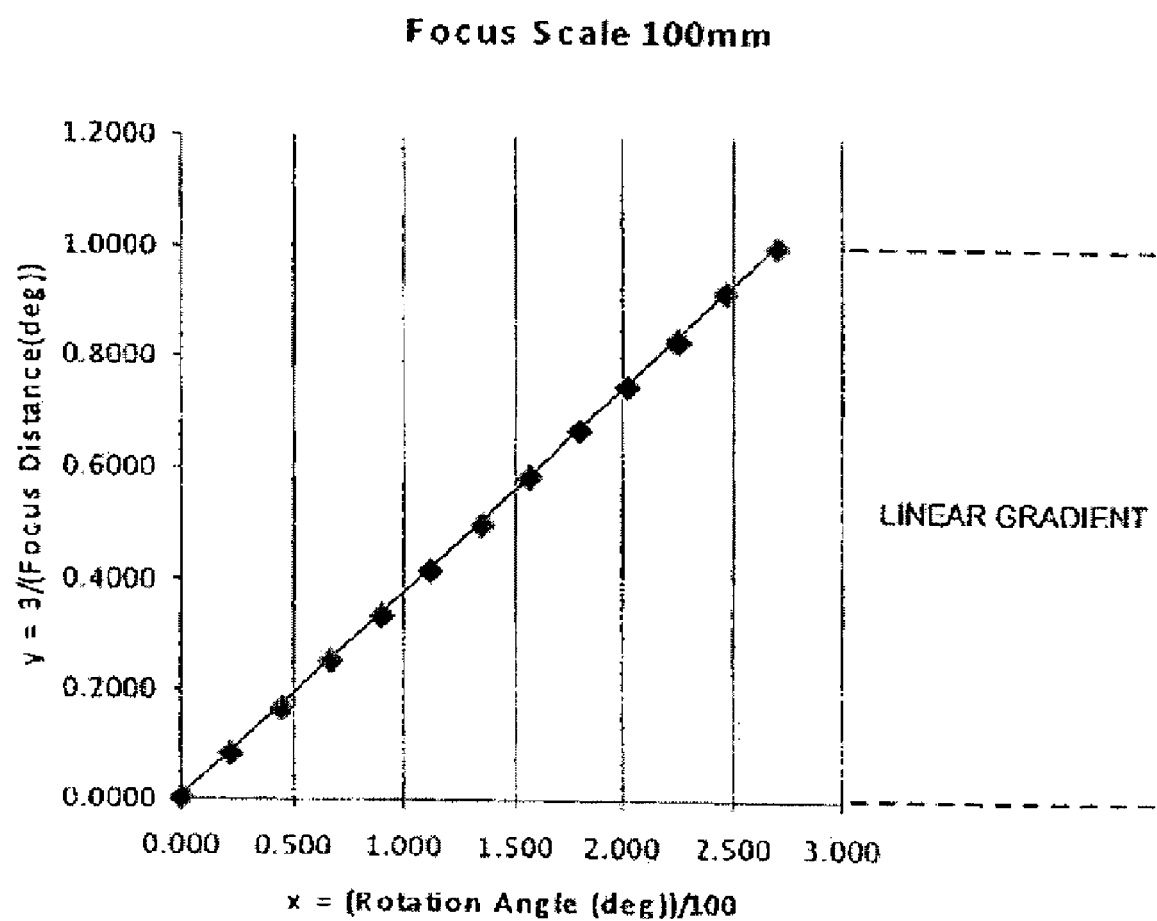
FIGS. 5a and 5b are graphical representations of the relationship between the degree of rotation of the focus ring of lenses employed in the assembly according to the invention and the corresponding focus distance of the lens.
Figure 5B:
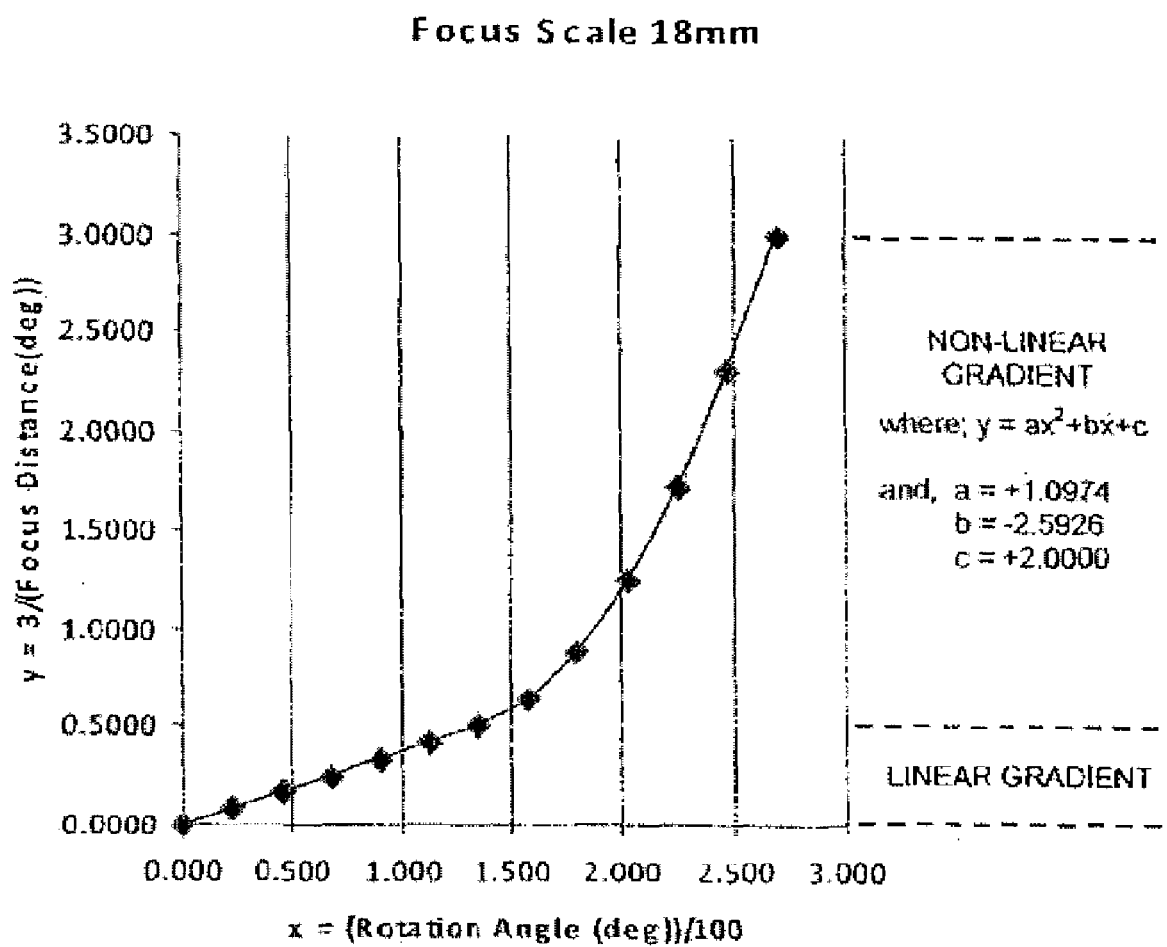

FIGS. 5a and 5b are graphical representations showing the degree of travel of the lens group in the lens from a reference position (in this case the position corresponding to the infinity focus distance) for the degree of rotation of the focus ring. FIG. 5a shows the travel of the lens group in the 100 mm focal length lens as a function of the rotation of the focus ring. In this graph the abscissa indicates the rotational angle of the focus ring, while the ordinate indicates both the focus distance (ranging from infinity to 3 feet) and 1/focus distance (in fact 3/focus distance in order to normalise the figures) ranging from zero (i.e. at the infinity focus distance) to 1.0000. The values for the travel of the lens group (y) in arbitrary units, and the focus distance (3/y) in feet for the rotation angle of the lens ring are given in the following table 1:

TABLE 1

| x | y | 100(x) Rotation Angle (degrees) | 3/y Focus Distance (feet) |
|---|---|---|---|
| 0.000 | 0.0000 | 0.0 | Infinity |
| 0.225 | 0.0883 | 22.5 | 36.00 |
| 0.450 | 0.1667 | 45.0 | 18.00 |
| 0.675 | 0.2500 | 67.5 | 12.00 |
| 0.900 | 0.3333 | 90.0 | 9.00 |
| 1.125 | 0.4167 | 112.5 | 7.20 |
| 1.350 | 0.5000 | 135.0 | 6.00 |
| 1.575 | 0.5833 | 157.5 | 5.14 |
| 1.800 | 0.6667 | 180.0 | 4.50 |
| 2.025 | 0.7500 | 202.5 | 4.00 |
| 2.250 | 0.8333 | 225.0 | 3.60 |
| 2.475 | 0.9167 | 247.5 | 3.27 |
| 2.700 | 1.0000 | 270.0 | 3.00 |

As can be seen, the lens is linear since the degree of travel of the lens group along the axis of the lens group has a constant value of 0.0833 arbitrary units for each 22.5° of rotation of the focus ring throughout the entire range of movement. It will be appreciated that the particular value 0.0833 is not of importance since this will depend on a number of factors such as the power of the lens group and the physical size of the lens. What is important is that the degree of travel is constant and so the lens may be formed using a screw thread or a cam follower in a helical cam to drive the lens group.

FIG. 5b is a graphical representation of the degree of travel of the lens group against rotation of the lens ring for a 21 mm focal length lens according to this embodiment of the invention. The values for the travel of the lens group (y) in arbitrary units, and the focus distance (3/y) in feet for the rotation angle of the lens ring are given in the following table 2:

TABLE 2

| x | y | 100(x) Rotation Angle (degrees) | 3/y Focus Distance (feet) |
|---|---|---|---|
| 0.000 | 0.0000 | 0.0 | Infinity |
| 0.225 | 0.0883 | 22.5 | 36.00 |
| 0.450 | 0.1667 | 45.0 | 18.00 |
| 0.675 | 0.2500 | 67.5 | 12.00 |
| 0.900 | 0.3333 | 90.0 | 9.00 |
| 1.125 | 0.4167 | 112.5 | 7.20 |
| 1.350 | 0.5000 | 135.0 | 6.00 |
| 1.575 | 0.6389 | 157.5 | 4.70 |
| 1.800 | 0.8889 | 180.0 | 3.38 |
| 2.025 | 1.2500 | 202.5 | 2.40 |
| 2.250 | 1.7222 | 225.0 | 1.74 |
| 2.475 | 2.3056 | 247.5 | 1.30 |
| 2.700 | 3.0000 | 270.0 | 1.00 |

As with the 100 mm lens, the infinity focus distance corresponds to rotation of the focus ring through 0°. As the focus ring is rotated through 135° the lens group moves through the same distance as in the 100 mm lens so that the lens will focus at 6 feet and the focus scales of the two lenses will be substantially exactly the same between these points. However, as the focus ring is rotated beyond 135°, the rate at which the lens group travels for any increment of rotation of the focus ring changes. In this embodiment, the cam surface of the lens group changes so that the travel of the lens group is now proportional to a polynomial function of the degree of rotation of the focus ring until the end of the range, in this case a quadratic function. The actual linear movement of the lens group along the axis of the lens is given in this example by the equation:

$$y = 1.0974x^2 - 2.5926x + 2$$

In other words, the rotation of the focus ring that is required to move the lens group will be a function of the square root of the travel of the lens group. Thus, as the focus ring is rotated from 135° to 157.5° the travel of the lens group changes from 0.0833 as in the case of the 100 mm lens to 0.1389 units. Further rotation through an angle of 22.5° to a value of 180° increases the travel of the lens group to 0.25 units, while a further rotation of 22.5° to 202.5° will increase the travel of the lens group by 0.361 units.

Although currently preferred, a quadratic relationship between the travel of the lens group and the rotation of the focus ring is not the only possible one, and any relationship can in principle be used. Thus the travel of the lens group may be proportional to the exponential of the rotation of the focus ring beyond the intermediate focus distance, or alternatively, may be given by a cubic polynomial of the rotation of the focus ring beyond the intermediate focus distance when the focus ring is rotated through the intermediate focus distance. What is preferred, however, is that the rate of travel of the lens group as a function of the rate of rotation of the focus ring changes smoothly from a linear relationship to a non-linear relationship at the intermediate focus distance. Thus the rate of travel of the lens group against rotation of the focus ring in the principal sub-region should be equal to the rate of travel against rotation of the focus ring in the additional sub-region at the intermediate focus distance. In other words, in the graph shown in FIG. 5b, the straight line of the travel of the lens group against rotation angle of the lens ring in the principal sub-range should touch the curved line of the travel of the lens group against rotation angle of the lens ring in the additional sub-range as a tangent.

In this embodiment, the position on the focus scale corresponding to the intermediate focus distance that separates the linear principal sub-range and the non-linear additional sub-range (6 feet in this case) is half way along the entire focus scale, but in other embodiments it may be located at different positions. Preferably the intermediate focus distance is located between one third to two thirds of the way along the focus scale, and especially from 40 to 60% of the way along the focus scale. In general it is preferred for the intermediate focus distance to be in the middle of the focus scale since shorter distances are shot less often, but also shots at distances in the additional sub-range extending from the intermediate focus distance to the close focus distance may be focused through the lens by means of an eye or auto focus. Focusing at distances corresponding to the principal sub-range generally has to be performed manually rather than by an eye or auto focus because objects that are not intended to be focused on get in the way particularly of the auto focus. Also, for a focus scale that requires rotation of the focus ring through 270° to span the entire scale, setting the position of intermediate focus distance half way along the focus scale will correspond to a rotation of 135° to span the principal sub-range, which is approximates to the maximum comfortable rotation by a single wrist operation.

As described in this embodiment, the focus scale of the lens is linear over the principal sub-range. However, while this is preferred, it is not essential to the invention at least in its broadest aspect. Thus by appropriate adjustment of the cam in this sub-range, it is possible for a variety of different relationships to exist between the travel of the lens group and the rotation of the focus ring. What is important is for the relationship in the principal sub-region to be the same for different lenses, and especially for all lenses in the assembly.

The invention claimed is:

1. A camera assembly which comprises a camera housing and a plurality of interchangeable lenses, any one of which can be attached to the camera housing for capturing an image;
    each lens having a body and a lens system comprising at least one lens element that is movable relative to the lens body to alter the focus distance of the lens, the lens having a focal length that differs from the focal length of the or each other lens;
    wherein each lens has a focus scale on one of the lens system and the lens body that comprises a plurality of focus distance marks, and a focus index mark on the other of the lens system and the lens body, so that the lens can be focused at a desired focus distance by relative movement of the focus scale and the focus index mark to align the focus index mark with the focus distance mark on the focus scale corresponding to the desired focus distance;
    the focus scale extending between a position corresponding to a far focus distance and a position corresponding to a close focus distance, and being divided into at least two sub-ranges that adjoin at a position corresponding to an intermediate focus distance, the sub-ranges having different curves defining their focus distance marks on the focus scale for the at least one lens element that is movable relative to the lens body and for at least one of the interchangeable lenses, one of the sub-ranges being a principal sub-range wherein the relative position of the focus scale and the focus index mark that is required to focus the lens at any focus distance within the principal sub-range is substantially the same for at least two lenses.

2. An assembly as claimed in claim 1, wherein the relative movement of the focus scale and the focus index mark that is required to focus the lens at any focus distance within the principal sub-range is substantially the same for all the lenses.

3. An assembly as claimed in claim 1, wherein the principal sub-range extends from a focus distance of 20 feet to a focus distance of six feet.

4. An assembly as claimed in claim 1, wherein the principal sub-range extends from a focus distance of infinity to a focus distance of six feet.

5. An assembly as claimed in claim 1, wherein the position on the focus scale corresponding to the intermediate focus distance is approximately at the mid point of the focus scale.

6. An assembly as claimed in claim 1, wherein the focus scale extends around part of the circumference of the lens, and the relative movement is effected by rotation of one of the focus scale and the focus index mark about the lens body.

7. An assembly as claimed in claim 6, wherein the said one of the focus scale and the focus index mark can be rotated about the lens body by at least 270°.

8. An assembly as claimed in claim 6, wherein movement of the lens element is proportional to the relative rotation of the focus scale and the focus index mark in the principal sub-range of the focus scale.

9. An assembly as claimed in claim 1, wherein the focus scale includes an additional sub-range in which the relative movement of the focus scale and the focus index mark that is required to focus the lens at a focus distance in the additional sub-range is different for different lenses.

10. An assembly as claimed in claim 6, wherein the focus scale includes an additional sub-range in which the relative movement of the focus scale and the focus index mark that is required to focus the lens at a focus distance in the additional sub-range is different for different lenses, and is not proportional to the relative rotation of the focus scale and the focus index mark.

11. An assembly as claimed in claim 10, wherein the focus scale is compressed in the additional sub-region for any lens having a focal length of less than 100 mm, so that the degree of movement of the lens element for any change in the relative position of the focus scale and the focus index mark in the additional sub-region is larger than in the principal sub-region.

12. An assembly as claimed in claim 10, wherein the focus scale is expanded in the additional sub-region for any lens having a focal length of greater than 100 mm, so that the degree of movement of the lens element for any change in the relative position of the focus scale and the focus index mark in the additional sub-region is smaller than in the principal sub-region.

13. An assembly as claimed in claim 10, wherein the relative movement of the focus scale and the focus index mark that is required to focus the lens at a focus distance in the additional sub-range is exponential relative to the relative rotation of focus scale and the focus index mark in the additional sub-range.

14. An assembly as claimed in claim 6, which includes a lens having a focal length of substantially 100 mm in which movement of the lens system is proportional to the relative rotation of the focus scale and the focus index mark throughout substantially the entire focus scale.

15. A lens which can be attached to a camera housing for capturing an image;
    the lens having a body and a lens system comprising at least one lens element that is movable relative to the lens body to alter the focus distance of the lens;
    wherein the lens has a focus scale comprising a plurality of focus distance marks extending around part of the circumference of one of the lens system and the lens body, and a focus index mark on the other of the lens system and the lens body, so that the lens system can be moved to focus the lens at a desired focus distance by relative rotation of the focus scale and the focus index mark to align the focus index mark with the focus distance mark on the lens scale corresponding to the desired focus distance;
    the focus scale extending between a position corresponding to a far focus distance and a position corresponding to a close focus distance, and being divided into at least two sub-ranges that adjoin at a position corresponding to an intermediate focus distance, one of the sub-ranges being a principal sub-range in which the position of the lens element varies in proportion to relative angular position of the focus scale and the focus index mark, and the other of the sub-ranges being an additional sub-range in which the position of the lens system is not proportional to the relative rotation of the focus scale and the focus index mark.

16. A lens as claimed in claim 15, wherein the position on the focus scale corresponding to the intermediate focus distance is approximately at the mid point of the focus scale.

17. A lens as claimed in claim 15, wherein the said one of the focus scale and the focus index mark can be rotated about the lens body by at least 270°.

18. A lens as claimed in claim 15, which has a focal length of less than 100 mm and the focus scale is compressed in the additional sub-range, so that the degree of movement of the lens element(s) for any change in the relative position of the focus scale and the focus index mark in the additional sub-region is larger than in the principal sub-region.

19. A lens as claimed in claim 15, which has a focal length of greater than 100 mm and the focus scale is expanded in the additional sub-region, so that the degree of movement of the lens element for any change in the relative position of the focus scale and the focus index mark in the additional sub-region is larger than in the principal sub-region.

20. A lens as claimed in claim 15, wherein the lens element move in the additional sub-region with a travel that is exponential in relation to the rotation of the focus scale in the additional sub-range.

21. A lens which can be attached to a camera housing for capturing an image;
    the lens having a body and a lens system comprising at least one lens element that is movable relative to the lens body to alter the focus distance of the lens;
    wherein the lens has a focus scale comprising a plurality of focus distance marks extending around part of the circumference of one of the lens system and the lens body, and a focus index mark on the other of the lens system and the lens body, so that the lens system can be moved to focus the lens at a desired focus distance by relative rotation of the focus scale and the focus index mark to align the focus index mark with the focus distance mark on the lens scale corresponding to the desired focus distance;
    the focus scale extending between a position corresponding to a far focus distance and a position corresponding to a close focus distance, and being divided into at least two sub-ranges that adjoin at a position corresponding to an intermediate focus distance, one of the sub-ranges being a principal sub-range that extends from a focus distance of 20 feet to a focus distance of six feet, and in which the position of the lens element varies in proportion to relative angular position of the focus scale and the focus index mark, and the other of the sub-ranges being an additional sub-range in which the position of the lens system is not proportional to the relative rotation of the focus scale and the focus index mark.

22. A lens which can be attached to a camera housing for capturing an image;
    the lens having a body and a lens system comprising at least one lens element that is movable relative to the lens body to alter the focus distance of the lens,
    wherein the lens has a focus scale comprising a plurality of focus distance marks extending around part of the circumference of one of the lens system and the lens body, and a focus index mark on the other of the lens system and the lens body, so that the lens system can be moved to focus the lens at a desired focus distance by relative rotation of the focus scale and the focus index mark to align the focus index mark with the focus distance mark on the lens scale corresponding to the desired focus distance;
    the focus scale extending between a position corresponding to a far focus distance and a position corresponding to a close focus distance, and being divided into at least two sub-ranges that adjoin at a position corresponding to an intermediate focus distance, one of the sub-ranges being a principal sub-range that extends from a focus distance of infinity to a focus distance of six feet, and in which the position of the lens element varies in proportion to relative angular position of the focus scale and the focus index mark, and the other of the sub-ranges being an additional sub-range in which the position of the lens system is not proportional to the relative rotation of the focus scale and the focus index mark.

23. A method of forming a range of interchangeable camera lenses, which comprises forming a number of lenses, each lens having a body and a lens system comprising at least one lens element that is movable relative to the lens body to alter the focus distance of the lens, the having a focal length that differs from the focal length of the or each other lens; and
    forming a focus scale on one of the lens system and the lens body that comprises a plurality of focus distance marks, and a focus index mark on the other of the lens system and the lens body, so that the lens can be focused at a desired focus distance by relative movement of the focus scale and the focus index mark to align the focus index mark with the focus distance mark on the lens scale corresponding to the desired focus distance;
    the focus scale extending between a position corresponding to a far focus distance and a position corresponding to a close focus distance, and being divided into at least two sub-ranges that adjoin at a position corresponding to an intermediate focus distance, the sub-ranges having different curves defining their focus distance marks on the focus scale for the at least one lens element that is movable relative to the lens body and for at least one of the interchangeable lenses, one of the sub-ranges being a principal sub-range wherein the relative movement of the focus scale and the focus index mark that is required to focus the lens at any focus distance within the principal sub-range is substantially the same for at least two lenses.

24. A method as claimed in claim 23, wherein the relative movement of the focus scale and the focus index mark that is required to focus the lens at any focus distance within the principal sub-range is substantially the same for all the lenses.

25. A method as claimed in claim 23, wherein the principal sub-range extends from a focus distance of 20 feet to a focus range of six feet.

26. A method as claimed in claim 23, wherein the principal sub-range extends from a focus distance of infinity to a focus range of six feet.

27. A method as claimed in claim 23, wherein the position on the focus scale corresponding to the intermediate focus distance is approximately at the mid point of the focus scale.

28. A method as claimed in claim 23, wherein the focus scale extends around part of the circumference of the lens, and the relative movement is effected by rotation of one of the focus scale and the focus index mark about the lens body.

29. A method as claimed in claim 28, wherein the said one of the focus scale and the focus index mark can be rotated about the lens body by at least 270°.

30. A method as claimed in claim 28, wherein movement of the lens system is proportional to the relative rotation of the focus scale and the focus index mark in the principal sub-range of the focus scale.

31. A method as claimed in claim 23, wherein the focus scale includes an additional sub-range in which the relative movement of the focus scale and the focus index mark that is required to focus the lens at a focus distance in the additional sub-range is different for different lenses.

32. A method as claimed in claim 28, wherein the focus scale includes an additional sub-range in which the relative movement of the focus scale and the focus index mark that is required to focus the lens at a focus distance in the additional sub-range is different for different lenses, and is not proportional to the relative rotation of the focus scale and the focus index mark.

33. A method as claimed in claim 32, wherein the focus scale is compressed in the additional sub-region for any lens having a focal length of less than 100 mm, so that the degree of movement of the lens system for any change in the relative position of the focus scale and the focus index mark in the additional sub-region is larger than in the principal sub-region.

34. A method as claimed in claim 32, wherein the focus scale is expanded in the additional sub-region for any lens having a focal length greater than 100 mm, so that the degree of movement of the lens element for any change in the relative position of the focus scale and the focus index mark in the additional sub-region is larger than in the principal sub-region.

35. A method as claimed in claim 33, wherein the travel of the lens element(s) in the additional sub-range is exponential in relation to the rotation of the focus scale in the additional sub-range.

* * * * *